(12) United States Patent
Diwan

(10) Patent No.: US 6,801,936 B1
(45) Date of Patent: Oct. 5, 2004

(54) SYSTEMS AND METHODS FOR GENERATING CUSTOMIZED BUNDLES OF INFORMATION

(76) Inventor: Arif Diwan, 1295 Phoenix Ave., Cranston, RI (US) 02921-1403

( * ) Notice: Subject to any disclaimer, the term of this patent is extended or adjusted under 35 U.S.C. 154(b) by 0 days.

(21) Appl. No.: 09/545,439

(22) Filed: Apr. 7, 2000

(51) Int. Cl.$^7$ .............................................. G06F 15/16
(52) U.S. Cl. ........................ 709/219; 709/203; 709/202; 709/249; 725/115; 725/97
(58) Field of Search .............................. 709/206, 207, 709/217, 218, 227, 219, 249, 203, 202; 340/825.44; 707/6, 4, 10; 705/10, 27; 370/313; 725/110, 115, 97

(56) References Cited

U.S. PATENT DOCUMENTS

| | | | | |
|---|---|---|---|---|
| 5,673,430 A | * | 9/1997 | Story .......................... | 725/116 |
| 5,758,257 A | * | 5/1998 | Herz et al. .................. | 725/116 |
| 5,819,284 A | * | 10/1998 | Farber et al. ............... | 707/104 |
| 5,838,252 A | * | 11/1998 | Kikinis ....................... | 340/7.21 |
| 5,838,912 A | * | 11/1998 | Poon et al. .................. | 709/204 |
| 5,893,091 A | * | 4/1999 | Hunt et al. ................... | 707/3 |
| 5,936,547 A | * | 8/1999 | Lund ...................... | 340/825.44 |
| 5,974,447 A | * | 10/1999 | Cannon et al. ............. | 709/206 |
| 6,021,433 A | * | 2/2000 | Payne et al. ................ | 709/219 |
| 6,029,195 A | | 2/2000 | Herz .......................... | 709/219 |
| 6,088,722 A | * | 7/2000 | Herz et al. .................. | 709/217 |
| 6,202,062 B1 | | 3/2001 | Cameron et al. ............. | 707/3 |
| 6,230,205 B1 | * | 5/2001 | Garrity et al. .............. | 709/231 |
| 6,236,991 B1 | * | 5/2001 | Frauenhofer et al. ......... | 707/6 |
| 6,237,022 B1 | * | 5/2001 | Bruck et al. ................ | 709/201 |
| 6,243,757 B1 | * | 6/2001 | Kanodia et al. ............ | 709/235 |
| 6,308,175 B1 | * | 10/2001 | Lang et al. .................... | 707/10 |
| 6,317,783 B1 | * | 11/2001 | Freishtat et al. ............ | 709/218 |
| 6,359,902 B1 | * | 3/2002 | Putzolu ...................... | 370/466 |
| 6,442,598 B1 | * | 8/2002 | Wright et al. ............... | 709/217 |
| 6,486,892 B1 | * | 11/2002 | Stern .......................... | 345/760 |
| 6,546,488 B2 | * | 4/2003 | Dillon et al. ............... | 713/181 |
| 6,594,682 B2 | * | 7/2003 | Peterson et al. ............ | 709/102 |
| 6,594,692 B1 | * | 7/2003 | Reisman ..................... | 709/219 |
| 2001/0003882 A1 | * | 6/2001 | Peterson et al. ........... | 709/219 |
| 2001/0034658 A1 | * | 10/2001 | Silva et al. .................... | 705/26 |

FOREIGN PATENT DOCUMENTS

WO    WO 97/48051    * 12/1997    .......... G06F/13/00

OTHER PUBLICATIONS

WebCanal White Paper, Global Information Broadcast, Dec. 31, 1997, from http://webcanal.inria.fr/white/, pp. 1–9.*
R. Ramanathan, "RFC2102," www.faqs.org/rfcs/rfc2122.html, Feb. 1997, 16 pages.

(List continued on next page.)

Primary Examiner—Glenton B. Burgess
Assistant Examiner—Bradley Edelman
(74) Attorney, Agent, or Firm—Ropes & Gray LLP

(57) ABSTRACT

A system (190) provides information to multiple subscribers (105–125). The system (190) receives requests for different types of information from the subscribers (105–125) and stores rules for delivering the requested information. The system (190) gathers information from multiple information sources (145–155), packages at least some of the gathered information into customized bundles according to the received requests and the stored rules, and delivers the customized bundles to the subscribers (105–125) according to the stored rules.

33 Claims, 5 Drawing Sheets

OTHER PUBLICATIONS

Baynetworks, "Exploiting Internetwork Multicast Services," www.baynetworks.com/products/reports/multicast.html, Jul. 29,1999 (print date), 22 pages.

StarBurst Communications, "StarBurst Allowed Patent Application on Multicast Technology that has Potential to Break Looming Internet Logjam," www.starburstcom.com/prpatent.htm, Jul. 29, 1996, 3 pages.

WebCanal, "Global Information Broadcast," monet.inria.fr/white/index.html, Dec. 31, 1997, 9 pages.

EntryPoint, "EntryPoint: The Internet Toolbar that really delivers," www.entrypoint.com, Jan. 26, 2000 (print date), 4 pages.

PointCast, "Enterprise Solutions," pioneer.pointcast.com/products/iserver, Jan. 26, 2000 (print date), 4 pages.

Netscape, "Netcenter," www.netcenter.com, Jan. 26, 2000 (print date), 2 pages.

Aether Technologies, "Enterprise Data Wireless Center," Feb. 1999, 15 pages.

Aether, "Mobeo Products," www.mobeo.com/product.html, Jan. 28, 2000 (print date), 3 pages.

* cited by examiner

SYSTEMS AND METHODS FOR GENERATING CUSTOMIZED BUNDLES OF INFORMATION

BACKGROUND OF THE INVENTION

A. Field of the Invention

The present invention relates generally to information distribution systems and, more particularly, to systems and methods that facilitate the distribution of information from various sources to multiple subscribers.

B. Description of Related Art

Over the last decade, networks, such as the Internet, have expanded by many orders of magnitude. The types of information provided over these networks have also increased and now include streaming audio, video, multi-player network interactive games, and other multimedia information. With the vast amount of information available, it has become extremely important to distribute the information in as efficient and economical a manner as possible, especially at the edges of the networks, where mobile nodes may tie into wireless networks.

Some conventional systems use broadcast technology to distribute information. Broadcasting permits information providers to send a single message that is replicated and transmitted across a network. If a user desires information from one or more broadcast streams, the user needs to identify the information providers that supply the information and constantly monitor the network for broadcast messages from the identified information providers. These conventional systems do not permit the user to customize the delivery of the information.

Other conventional systems use multicast technology to distribute information. Multicasting permits information providers to send a single message that is replicated and transmitted to hundreds and thousands of subscribers across a network. If a user desires information in this case, the user must determine what information providers supply the desired information and subscribe to their information delivery services. It is not always easy, however, to find these information providers and once they are found, they may not permit the user to customize the delivery of the information.

As a result, a need exists for a system that facilitates the information request process and permits users to customize the types of information they receive.

SUMMARY OF THE INVENTION

Systems and methods consistent with the present invention address this need by providing at least one agent that gathers information from multiple sources, packages the information into customized bundles, and delivers the bundles to subscribers according to a set of rules using multicast routing techniques.

In accordance with the purpose of the invention as embodied and broadly described herein, a system provides information to multiple subscribers. The system receives requests for different types of information from the subscribers and stores rules for delivering the requested information. The system gathers information from multiple information sources, packages at least some of the gathered information into customized bundles according to the received requests and the stored rules, and delivers the customized bundles to the subscribers according to the stored rules.

In another implementation consistent with the present invention, an agent connects to at least one information source and at least one subscriber. The agent includes a memory and a processor. The memory stores instructions. The processor executes the instructions in the memory to collect different types of information from the information sources, package at least some of the collected information into bundles based on preferences of the subscribers, generate multicast messages containing the bundles, and transmit the multicast messages to appropriate ones of the subscribers.

In a further implementation consistent with the present invention, a method for delivering information includes receiving requests for different types of information from multiple subscribers; collecting information from multiple information sources over a network; identifying parts of the collected information common to the requests of a group of the subscribers; generating a multicast message containing the common information; and transmitting the multicast message to the group of subscribers.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention efficiently and economically distribute information from multiple sources to multiple subscribers. The systems and methods gather information from the sources, package them into customized bundles according to requests and rules defined by the subscribers and/or agent managers, and transmit the bundles to the subscribers based on the rules using Internet protocol (IP) multicast routing techniques. IP multicast, coupled with multicast routing techniques, provides a powerful mechanism by which to distribute information to a very large number of subscribers from a single source.

EXEMPLARY NETWORK

Figure 1:
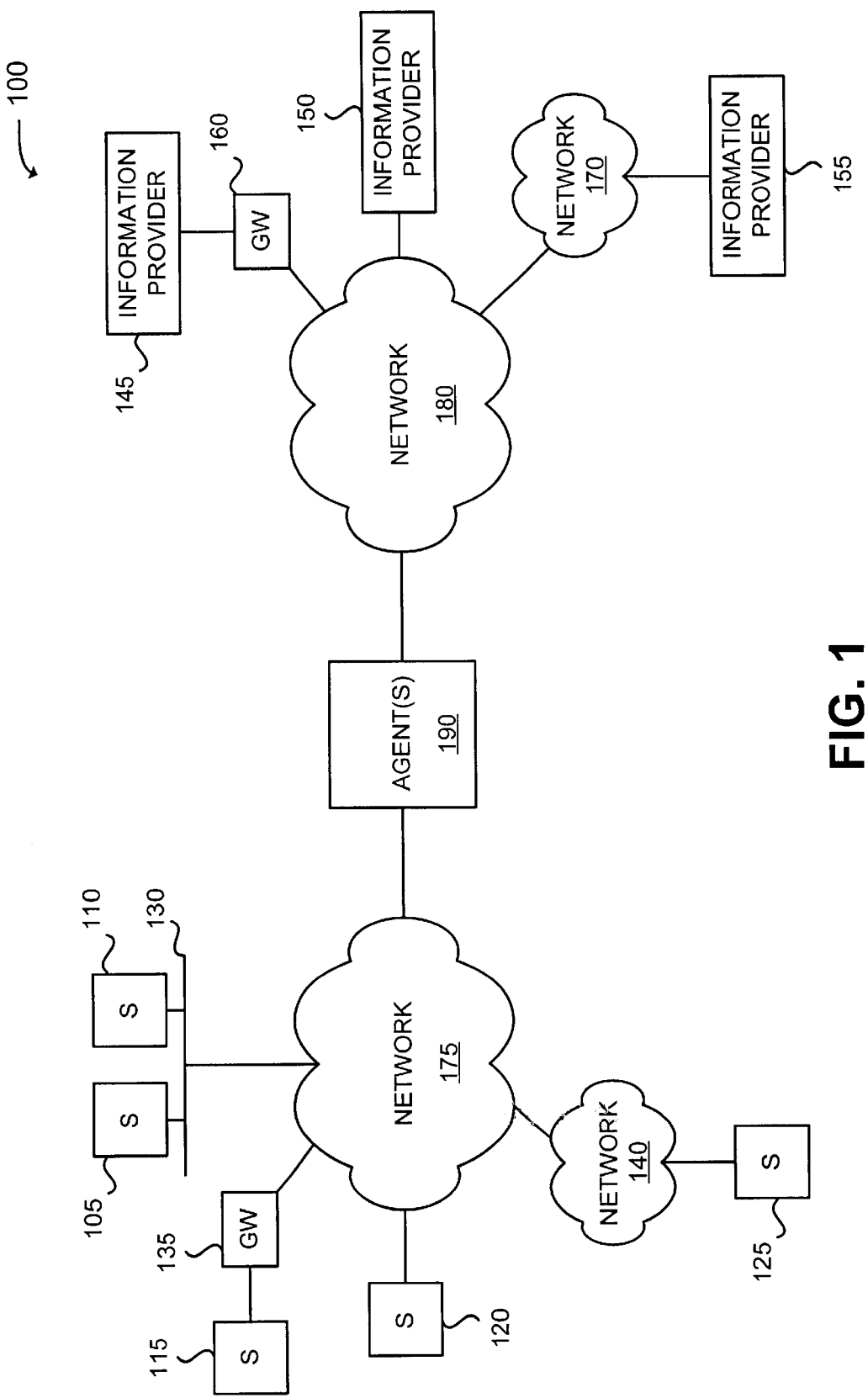
FIG. 1 is a diagram of an exemplary network in which systems and methods consistent with the present invention may be implemented.

FIG. 1 is a diagram of an exemplary network 100 in which systems and methods consistent with the present invention may be implemented. The network 100 may include multiple subscribers 105–125 and multiple information providers 145–155 connected via networks 175 and 180, respectively, to one or more agents 190. The networks 175 and 180 may include the Internet, an intranet, a wide area network (WAN), a metropolitan area network (MAN), a local area network (LAN), a public telephone network, such as the public switched telephone network (PSTN), or a similar network. In addition, the networks 175 and 180 may comprise a single network or separate networks.

The subscribers 105–125 may include any combination of personal computers, personal digital assistants (PDAs), laptops, mobile or portable telephones, and similar communication devices that request information supplied by one or more of the information providers 145–155. The subscribers 105–125 may connect to the network 175 in several different ways, including wired, wireless, and optical connections. For example, subscribers 105 and 110 connect to the network 175 via a LAN 130; subscriber 115 connects to the network 175 via a conventional gateway 135; subscriber 120 connects to the network 175 via a wired, wireless, or optical connection; and subscriber 125 connects to the network 175 via a separate network 140 that may include the Internet, an intranet, a WAN, a LAN, etc. Five subscribers have been shown in FIG. 1 for simplicity. Additional subscribers may also be included in the network 100.

The information providers 145–155 may include servers, personal computers, laptops, or similar devices that supply information to whomever wants it and/or subscribes to the service. The information providers 145–155 may broadcast streams of information onto the network 180. One example of an information provider may include a news web site, such as NBC.com, that broadcasts streams of news information.

Alternatively, the information providers 145–155 may transmit multicast messages containing information. In this case, the information providers 145–155 may receive requests for information according to any conventional protocol, such as the hyper text transfer protocol (HTTP), the simple mail transfer protocol (SMTP), the network virtual terminal protocol (Telnet), and the like. In response to the requests, the information providers 145–155 may generate multicast messages that include the requested information, such as stock quotes, weather or sports reports, etc., and transmit them using conventional multicast routing techniques. One example of an information provider may include the web site Weather.com that provides up-to-date weather reports to its subscribers.

To accomplish the broadcast or multicast transmissions, the information providers 145–155 may connect to the network 180 in a number of different ways, including wired, wireless, and optical connections. For example, information provider 145 connects to the network 180 via a conventional gateway 160; information provider 150 connects to the network 180 via a wired, wireless, or optical connection; and information provider 155 connects to the network 180 via a separate network 170 that may include the Internet, an intranet, a WAN, a LAN, etc. Three information providers have been shown in FIG. 1 for simplicity. Additional information providers may also be included in the network 100.

Figure 2:
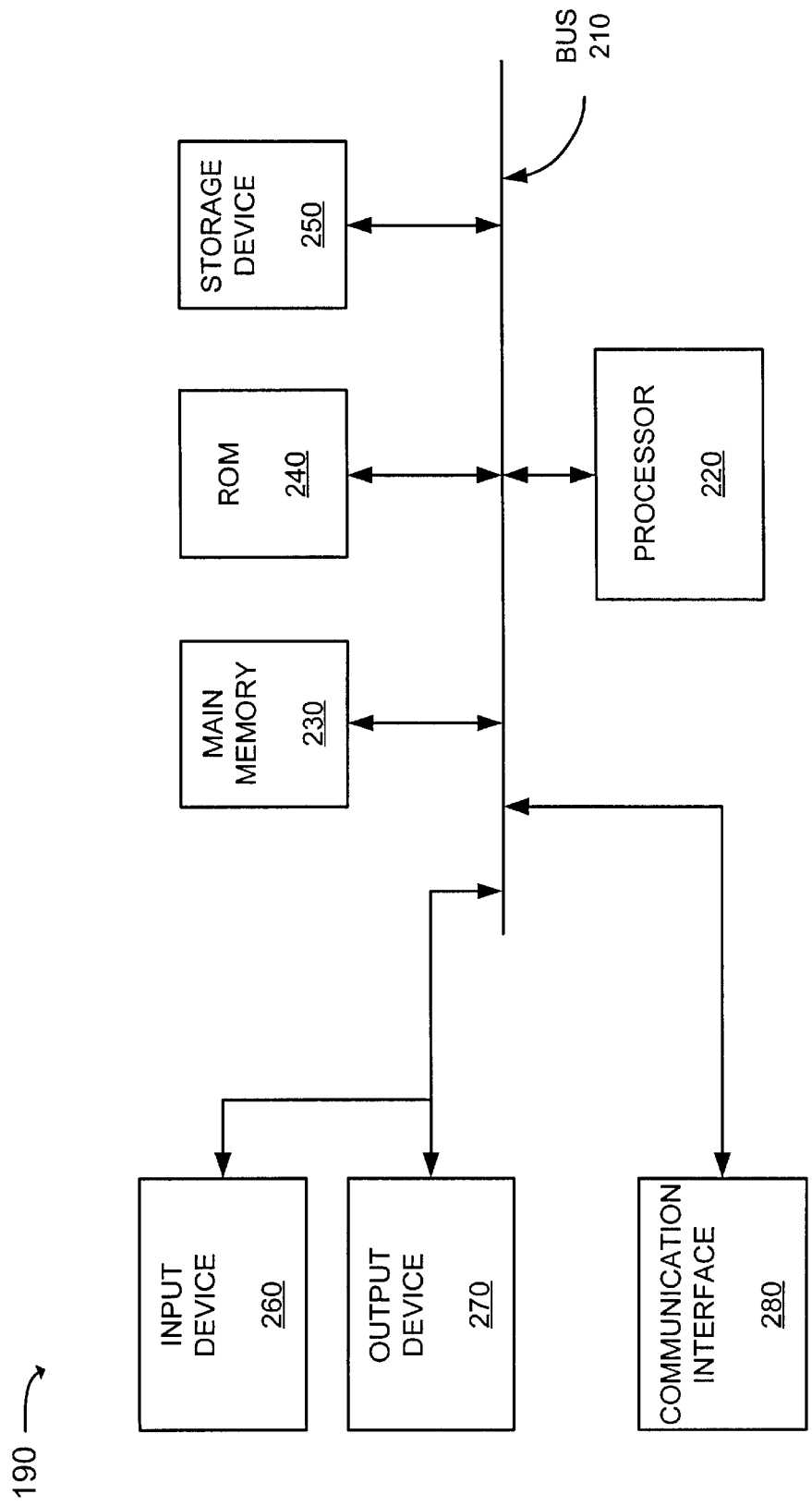
FIG. 2 is a detailed diagram of an agent in the network of FIG. 1.

The agent(s) 190 take requests from the subscribers 105–125 for supplying them with information supplied by the information providers 145–155. FIG. 2 is an exemplary diagram of an agent 190 in one implementation consistent with the present invention. In this implementation, the agent 190 is a stand-alone device. In other implementations, the agent 190 may be a virtual entity whose functions are distributed over several devices or implemented as software within a single device, such as network router.

The agent 190 may include a bus 210, a processor 220, a main memory 230, a read only memory (ROM) 240, a storage device 250, an input device 260, an output device 270, and a communication interface 280. The bus 210 permits communication among the components of the agent 190.

The processor 220 may include any type of conventional processor or microprocessor that interprets and executes instructions. The main memory 230 may include a random access memory (RAM) or another dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include any conventional mechanism that permits an operator to input information to the agent 190, such as a keyboard, a mouse, a pen, voice recognition and/or biometric mechanisms, etc. The output device 270 may include any conventional mechanism that outputs information to the operator, including a display, a printer, a pair of speakers, etc. The communication interface 280 may include any transceiver-like mechanism that enables the agent 190 to communicate with other devices and/or systems. For example, the communication interface 280 may include mechanisms for communicating with another device or system via a network, such as networks 175 and 180.

As will be described in detail below, an agent 190, consistent with the present invention, repackages information from information providers into customized bundles and provides the bundles to subscribers in accordance with a set of rules using, for example, IP multicast routing techniques. The agent 190 performs these tasks in response to processor 220 executing sequences of instructions contained in, for example, memory 230. These instructions may be read into memory 230 from another computer-readable medium, such as the storage device 250, or from another device via the communication interface 280.

Execution of the sequences of instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Subscriber Database

Figure 3:
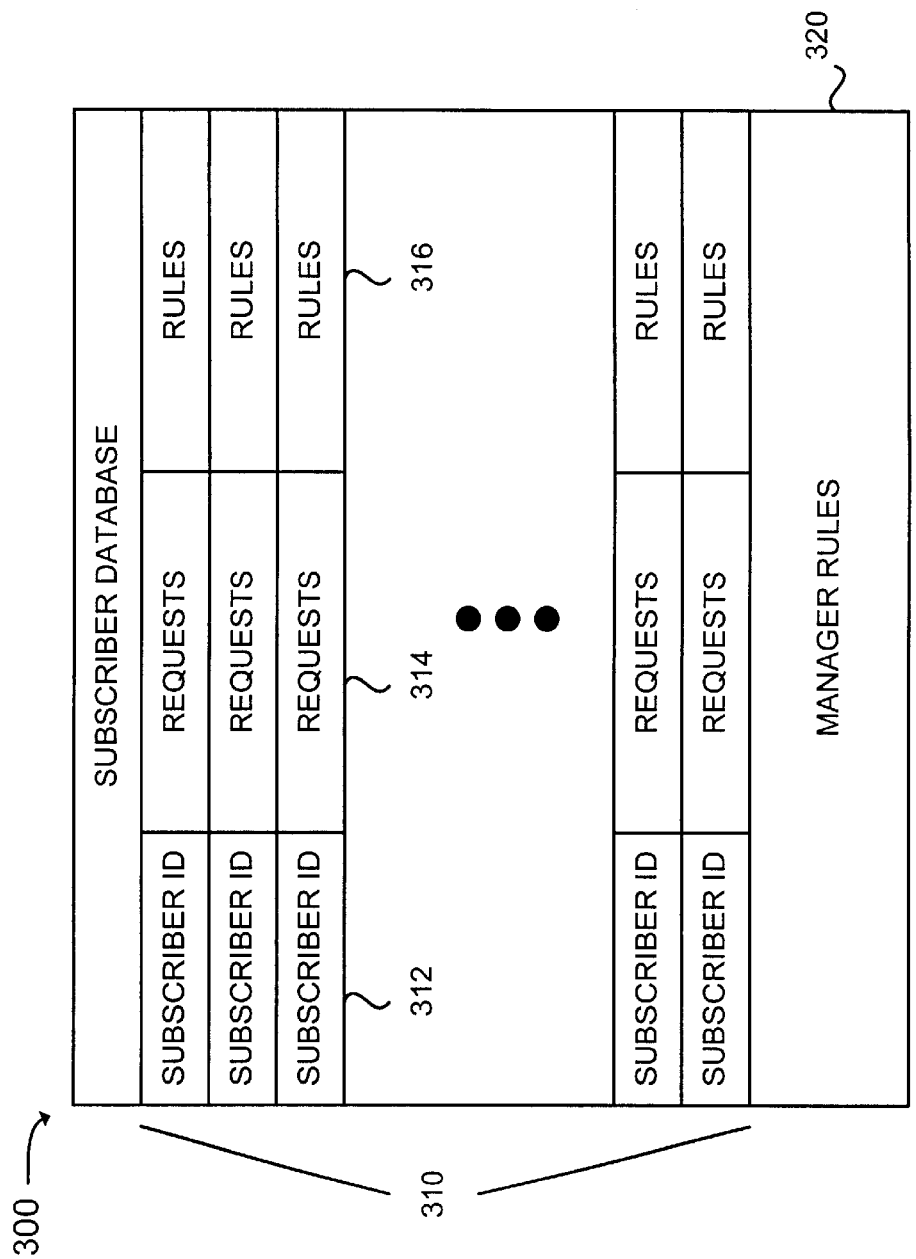
FIG. 3 is an exemplary diagram of a subscriber database in the agent of FIG. 2.

The agent 190 may store a subscriber database that controls packaging and distribution operations performed by the agent 190. FIG. 3 is an exemplary diagram of a subscriber database 300 consistent with the present invention. The subscriber database 300 may physically reside in the storage device 250 or main memory 230 of the agent 190 or may be stored in an external memory device accessible by the agent 190 via the communication interface 280.

The subscriber database 300 may include multiple entries 310, corresponding to multiple subscribers, and manager rules 320. Each of the entries 310 may include a subscriber identifier field 312, a requests field 314, and a rules field 316. The subscriber identifier field 312 may store a unique identifier for a particular subscriber or group of subscribers.

The requests field 314 may store information that indicates the types of information that the subscriber(s) identified in the corresponding subscriber identifier field 312 desires. The requests field 314 may include, for example, requests for stock quotes, current weather conditions, sports scores, news headlines, etc. The requests may be general or specific in nature. For example, a subscriber might request stock quotes for GTE stock, weather conditions for Boston, NBA scores, and all news headlines concerning Fortune 500 companies.

The rules field 316 may store rules that control the manner in which the agent 190 bundles and distributes the information it receives from the information providers. The rules might specify whether the subscriber wants the agent 190 to always complete a bundle or to fulfill partial orders (i.e., a bundle that includes a portion, but not all, of the information requested by the subscriber), the intervals at which the bundles must be released to subscriber, the form that the subscriber wants the bundle delivered (e.g., in text or audio format), etc.

The manager rules 320 include rules established by an agent manager. The agent manager may be a person or system that establishes a set of "ground rules" for the agent 190 to help the agent 190 operate in an efficient and economical manner. These rules might specify whether to form unions and intersections of requests to generate bundles of optimal size that will satisfy the requests of several subscribers, and whether to generate bundles with less and/or more information than the subscribers request.

Processing for Registering a Subxcriber

Figure 4:
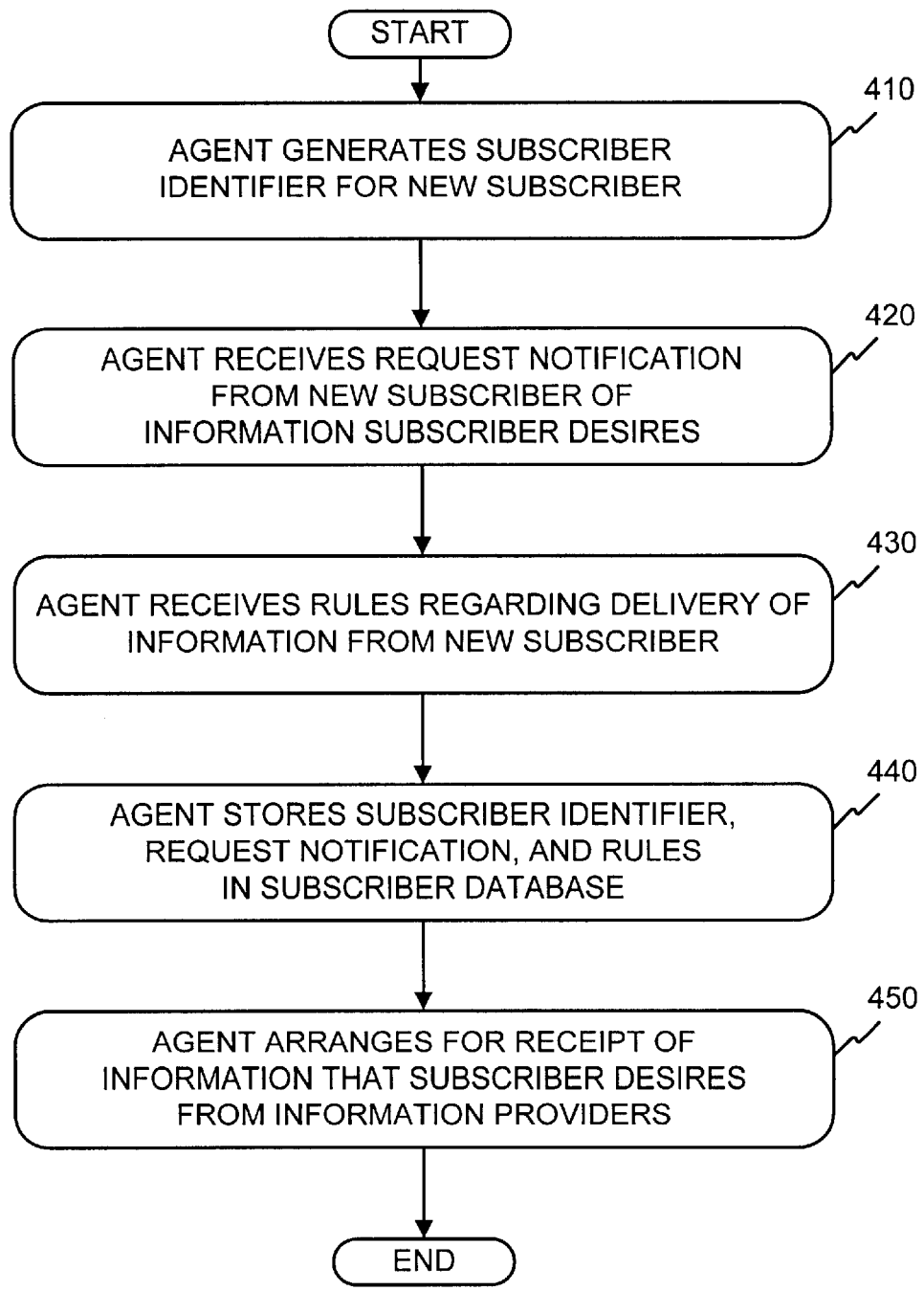
FIG. 4 is a flowchart of processing for registering with an agent to receive customized bundles of information.

FIG. 4 is a flowchart of processing for registering with an agent to receive customized bundles of information. When a subscriber desires to register with an agent, such as agent 190, the subscriber contacts the agent 190 in a conventional manner. For example, the subscriber may access a web site of the agent 190 via a network, such as the Internet, contact the agent 190 via a data or voice connection, email the agent 190, or establish contact with the agent 190 via other mechanisms. Once the subscriber contacts the agent 190, the agent 190 may generate a subscriber identifier for the new subscriber [step 410]. The agent 190 may automatically generate a numeric or alphanumeric identifier for the subscriber or may permit the subscriber to provide an identifier.

The agent 190 prompts the subscriber for the type(s) of information that the subscriber desires to receive. For example, the agent 190 may present the subscriber with a list of available information services and permit the subscriber to select from the list. Alternatively, the agent 190 may permit the subscriber to specify the information services that the subscriber desires without presenting the subscriber with a list. In any event, the agent 190 receives a request notification (i.e., a selection) from the subscriber indicating the information services that the subscriber desires [step 420].

The agent 190 prompts the subscriber for delivery rules that indicate the manner in which the subscriber wants the information delivered. For example, the subscriber might specify that the information must be delivered by 5:00 PM each day, whether the subscriber wants all of the information or will accept some of it, etc. The subscriber provides the rules to the agent 190 [step 430]. The agent 190 then stores the subscriber identifier, request notification, and rules in the appropriate fields of an entry 310 in the subscriber database 300 [step 440].

If the subscriber requests information that the agent 190 does not already obtain for another subscriber, the agent 190 may identify the information provider that broadcasts the information and arrange to receive the broadcast stream [step 450]. Alternatively, the agent 190 may request delivery of the information from an information provider [step 450]. In this case, the agent 190 may obtain a multicast group identification (ID) address from the information provider for use by the agent 190 in receiving the information provided by the information provider. The agent 190 then begins listening for information from information providers using one or more multicast group ID addresses.

Processing for Packaging and Distributing Information

Figure 5:
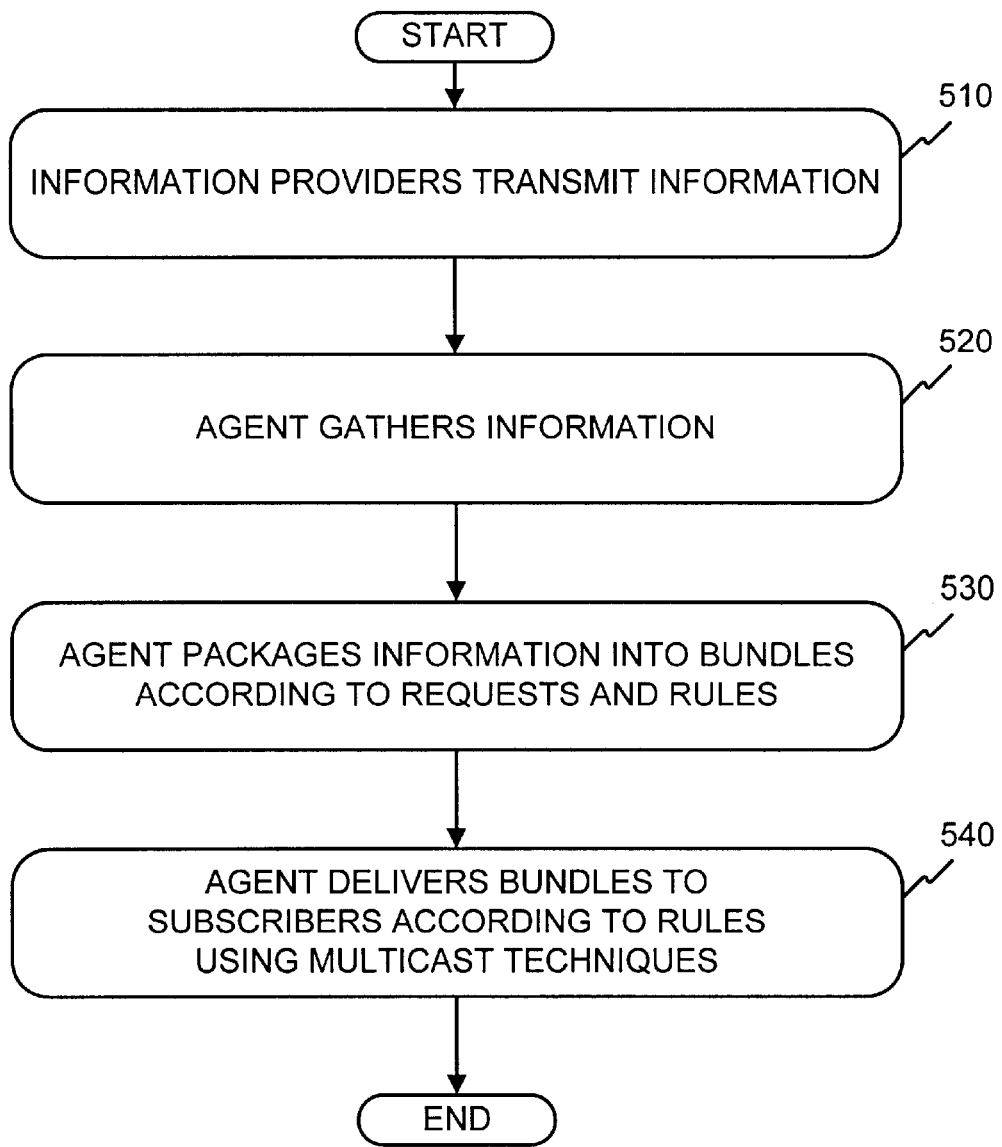
FIG. 5 is a flowchart of processing for packaging and distributing information to subscribers.

FIG. 5 is a flowchart of processing for packaging and distributing information to subscribers. In their usual course of business, information providers transmit information, such as stock quotes, sports scores, etc., onto the network 180 [step 510]. The information providers may transmit the information using broadcast or multicast techniques. Members of a multicast group are identified by a common multicast group ID address. The agent 190 listens for the broadcast streams and, using its multicast group ID addresses, the multicast messages to select the information its subscribers desire [step 520].

Based on the requests and rules stored in its subscriber database 300, the agent 190 packages the messages into customized bundles [step 530]. The requests might indicate, for example, that a particular subscriber wants to receive stock quotes for GTE stock and sports scores relating to NBA games. The rules might dictate that the agent 190 form unions and intersections of subscriber requests to generate bundles of optimal size. These bundles might actually contain more or less information than desired by the particular subscribers. In the case where the bundles contain more information, software used by the subscribers may discard the extraneous information.

Once the bundles of information have been generated, the agent 190 distributes them to the subscribers [step 540]. The agent 190 may use IP multicast techniques to distribute a bundle to all of the subscribers requesting the information. The subscriber receives the information, possibly using a multicast group ID address, discards any extraneous information, and provides the requested information to a user. For example, the subscriber may present the requested information to the user as scrolling text in a pop-up window on a display.

Conclusion

Systems and methods consistent with the present invention improve the delivery of information from multiple sources by providing one or more agents that receive the information from the sources, package the information into customized bundles, and deliver the bundles according to a set of rules using multicast routing techniques.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the agent 190 has been described as passively listening for multicast messages from information providers. In another implementation consistent with the present invention, the agent 190 actively gets the desired information by accessing web sites, for example, of the information providers.

In yet another implementation consistent with the present invention, the subscribers subscribe to various information services provided by the information providers. The information providers provide the subscribers with multicast group ID addresses. The subscribers, in turn provide the group ID addresses to the agent 190. The agent 190, thereafter, intercepts messages from the information providers intended for the subscribers and bundles the information for them.

The scope of the invention is defined by the claims and their equivalents.

What is claimed is:

1. A method for providing information to a plurality of subscriber devices, comprising:

receiving requests for different types of information from the subscriber devices;

storing rules, received from the subscriber devices, that specify a manner for delivering the requested information;

gathering information from a plurality of information providers;

packaging at least some of the gathered information into customized bundles according to the received requests and the stored rules, the packaging including:

grouping information that satisfies the requests from multiple ones of the subscriber devices; and delivering the customized bundles to the multiple subscriber devices according to the stored rules.

2. The method of claim 1, wherein the receiving requests includes:

providing a list of available information services that supply the different types of information to each of the subscriber devices, and receiving a selection of one or more of the information services from the list.

3. The method of claim 1, wherein the rules dictate a manner in which the requested information is bundled and presented to the subscriber devices.

4. The method of claim 3, wherein the rules indicate at least one of whether to complete a bundle, whether to fulfill partial orders, intervals at which the bundles are to be delivered to the subscriber devices, and a form in which the bundles are to be delivered to the subscriber devices.

5. The method of claim 1, wherein the storing rules includes:

obtaining general delivery rules that pertain to all of the sub subscriber devices.

6. The method of claim 1, wherein the packaging includes:

generating multicast messages that include the customized bundles.

7. The method of claim 6, wherein the delivering includes:

transmitting the multicast messages to the multiple subscriber devices using Internet protocol multicasting and taking advantage of multicast routing protocols.

8. The method of claim 6, wherein the delivering includes:

transmitting the multicast messages to the multiple subscriber devices using Internet multicast group addresses and taking advantage of Internet protocol multicast routing techniques.

9. A method for providing information to a plurality of subscriber devices, comprising:

receiving requests for different types of information from the subscriber devices;

storing rules that specify a manner for delivering the requested information;

gathering information from a plurality of information providers, the gathering including:

contacting the information providers to request delivery of the requested information, obtaining a multicast group identification address from each of the information providers, and listening for messages from the information providers that contain one of the multicast group identification addresses;

packaging at least some of the gathered information into customized bundles according to the received requests and the stored rules; and delivering the customized bundles to the subscriber devices according to the stored rules.

10. The method of claim 1, wherein the gathering includes:

listening for broadcast streams from the information providers that contain the requested information.

11. A system for providing information to a plurality of subscribers, comprising:

means for receiving requests for different types of information from the subscribers;

means for storing rules, received from the subscribers, that dictate a manner for delivering the requested information;

means for gathering information from a plurality of information providers;

means for packaging at least some of the gathered information into customized bundles according to the received requests and the stored rules by grouping information that satisfies the requests of multiple ones of the subscribers; and means for delivering the customized bundles to the multiple subscribers according to the stored rules.

12. A system that provides information to a plurality of users, comprising:

a communication interface configured to receive requests for different types of information from the users;

a memory configured to store rules, received from the users, that specify a manner for delivering the requested information; and a processor configured to:

gather information from a plurality of information providers, package at least some of the gathered information into customized bundles according to the received requests and the stored rules by grouping information that satisfies the requests of multiple ones of the users, and deliver the customized bundles to the multiple users according to the stored rules.

13. The system of claim 12, wherein the communication interface is further configured to transmit a list of available information services that supply the different types of information to each of the users and receive a selection of one or more of the information services from the list.

14. The system of claim 12, wherein the rules dictate a manner in which the requested information is bundled and presented to the users.

15. The system of claim 14, wherein the rules indicate at least one of whether to complete a bundle, whether to fulfill partial orders, intervals at which the bundles are to be delivered to the users, and a form in which the bundles are to be delivered to the users.

16. The system of claims 12, wherein the memory is further configured to store delivery rules that pertain to all of the users.

17. The system of claim 12, wherein the processor is further configured to listen for broadcast streams from the information providers that contain the requested information.

18. The system of claim 12, wherein the processor is further configured to generate multicast messages that include the customized bundles.

19. The system of claim 18, wherein the processor is further configured to use multicast routing techniques to transmit the multicast messages to the multiple users.

20. The system of claim 18, wherein the processor is further configured to use Internet protocol multicast routing techniques to transmit the multicast messages to the multiple users.

21. A system that provides information to a plurality of users, comprising:

a communication interface configured to receive requests for different types of information from the users;

a memory configured to store rules that specify a manner for delivering the requested information; and a processor configured to:

gather information from a plurality of information providers by:

contacting the information providers to request delivery of the requested information, obtaining a multicast group identification address from each of the information providers, and listening for messages from the information providers that contain one of the multicast group identification addresses, package at least some of the gathered information into customized bundles according to the received requests and the stored rules, and deliver the customized bundles to the users according to the stored rules.

22. A computer-readable medium that stores instructions executable by at least one processor to perform a method for providing information to a plurality of subscriber devices, comprising:

gathering information from a plurality of information providers;

packaging at least some of the gathered information into customized bundles based on a plurality of information requests and delivery rules, the information requests including requests from the subscriber devices for different types of information, the delivery rules including rules, received from the subscriber devices, that control a manner of delivery of the requested information, the packaging including:
grouping information that satisfies the requests of multiple ones of the subscriber devices; and delivering the customized bundles to the multiple ones of the subscriber devices according to the delivery rules.

23. The computer-readable medium of claim 22, wherein the gathering includes:

listening for broadcast streams from the information providers that contain the requested information.

24. The computer-readable medium of claim 22, wherein the packaging includes:

generating multicast messages that include the customized bundles.

25. The computer-readable medium of claim 24, wherein the delivering includes:

transmitting the multicast messages to the multiple subscriber devices.

26. The computer-readable medium of claim 24, wherein the delivering includes:

using Internet protocol multicast routing techniques to transmit the multicast messages to the multiple subscriber devices.

27. The computer-readable medium of claim 22, herein the delivery rules indicate at least one of whether to complete a bundle, whether to fulfill partial orders, intervals at which the bundles are to be delivered to the multiple ones of the subscriber devices, and a form in which the bundles are to be delivered to the multiple ones of the subscriber devices.

28. A computer-readable medium that stores instructions executable by at least one processor to perform a method for providing information to a plurality of subscriber devices, comprising:

gathering information from a plurality of information providers by:
contacting the information providers to request delivery of information,
obtaining a multicast group identification address from each of the information providers, and
listening for messages from the information providers that contain one of the multicast group identification addresses;

packaging at least some of the gathered information into customized bundles based on a plurality of information requests and delivery rules, the information requests including requests from the subscriber devices for different types of information, the delivery rules including rules that control delivery of the requested information; and delivering the customized bundles to the subscriber devices according to the delivery rules.

29. An agent connected to at least one information source and at least one subscriber, comprising:

a memory configured to store instructions and delivery rules, received from the subscribers, that dictate a manner in which information is provided to the subscribers; and a processor configured to execute the instructions in the memory to collect different types of information from the information sources, package at least some of the collected information into bundles based on the delivery rules, generate multicast messages containing the bundles, and transmit the multicast messages to appropriate ones of the subscribers according to the delivery rules, the delivery rules including at least one of whether to complete a bundle, whether to fulfill partial orders, intervals at which the bundles are to be delivered to the subscribers, and a form in which the bundles are to be delivered to the subscribers.

30. The agent of claim 29, herein the processor is further configured to receive messages containing the different types of information from the information sources.

31. The agent of claim 30, wherein the received messages include at least one of multicast messages and broadcast message streams.

32. The agent of claim 29, wherein the processor is configured to transmit the multicast messages to the subscribers taking advantage of Internet protocol multicast routing techniques.

33. A method for delivering information, comprising:

receiving requests for different types of information from a plurality of subscriber devices;

collecting information from a plurality of information sources over a network;

identifying parts of the collected information common to the requests of a group of the subscriber devices according to delivery rules, the delivery rules indicating a manner in which the common information is bundled;

creating a multicast message containing the common information; and transmitting the multicast message to the group of subscriber devices.

* * * * *

UNITED STATES PATENT AND TRADEMARK OFFICE
CERTIFICATE OF CORRECTION

PATENT NO. : 6,801,936 B1  
DATED : October 5, 2004  
INVENTOR(S) : Arif Diwan

It is certified that error appears in the above-identified patent and that said Letters Patent is hereby corrected as shown below:

Column 7,  
Line 23, change "sub subscriber devices" to -- subscriber devices --;

Column 9,  
Line 44, change "claim 22, herein" to -- claim 22, wherein --;

Column 10,  
Line 33, change "claim 29, herein" to -- claim 29, wherein --

Signed and Sealed this

Fourth Day of January, 2005

JON W. DUDAS  
*Director of the United States Patent and Trademark Office*